(12) United States Patent
Onda

(10) Patent No.: US 6,304,242 B1
(45) Date of Patent: Oct. 16, 2001

(54) METHOD AND APPARATUS FOR DISPLAYING IMAGE

(75) Inventor: Yasuyuki Onda, Miki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/403,024

(22) PCT Filed: Feb. 19, 1999

(86) PCT No.: PCT/JP99/00744

§ 371 Date: Oct. 19, 1999

§ 102(e) Date: Oct. 19, 1999

(87) PCT Pub. No.: WO99/42986

PCT Pub. Date: Aug. 26, 1999

(30) Foreign Application Priority Data

Feb. 19, 1998 (JP) .................................................. 10-036919

(51) Int. Cl.$^7$ ....................................................... G09G 3/36
(52) U.S. Cl. ................................ 345/99; 100/127; 100/98
(58) Field of Search .................................. 345/94, 95, 98, 345/99, 100, 204, 208, 89, 210, 211, 212, 219, 209, 132, 214, 127, 87, 572, 574; 348/556, 792, 213

(56) References Cited

U.S. PATENT DOCUMENTS

| | | | |
|---|---|---|---|
| 5,767,830 | * 6/1998 | Kawamura | 345/99 |
| 5,844,539 | * 12/1998 | Kitagawa | 345/100 |
| 6,175,351 | * 1/2001 | Matsuura et al. | 345/98 |

* cited by examiner

*Primary Examiner*—Bipin Shalwala
*Assistant Examiner*—Mansour M. Said
(74) *Attorney, Agent, or Firm*—Oblon, Spivak, McClelland, Maier & Neustadt, P.C.

(57) ABSTRACT

An image displaying device comprises a display panel including display pixels connected to signal lines signal line driving circuit sections for sampling a video signal including effective video periods and blanking periods between effective video periods to produce pixel signal voltages and supplying the voltages to the signal lines for each of the horizontal scanning lines a drive timing select circuit section for selecting one of a first timing and a second timing in the blanking period of the video signal and a polarity inverting circuit section for inverting the video signal in polarity with respect to a reference voltage on the basis of a selected one of the first and second timing, wherein the drive timing select circuit section is arranged such that each of the first timing and the second timing is selectable when a pixel signal voltage corresponding to the first video signal is obtained from the video signal and outputted to the signal lines for each of the horizontal scanning lines.

25 Claims, 12 Drawing Sheets

METHOD AND APPARATUS FOR DISPLAYING IMAGE

TECHNICAL FIELD

This invention relates to an image displaying method and device for sequentially sampling an input video signal to display an image in an effective display area having an aspect ratio of X/Y (X: width, Y: height).

BACKGROUND ART

Liquid-crystal display devices have been used in various fields as typical display devices for personal computers and word processors, as display devices for television sets and car navigation systems, and further for projection-type display devices, because of their thinness, lightness, and low power consumption. Specifically, active-matrix liquid-crystal display devices have display pixels electrically connected to switching elements, and research and development thereof have been made actively because they provide good display images without crosstalk between adjacent pixels.

In recent years, display devices having the effective display area with an aspect ratio of 4/3 have been being replaced with display devices having the effective display area elongated in the direction of horizontal scanning line, such as the effective display area with an aspect ratio of 16/9. This aspect ratio provides the user with a visually wide screen.

There have been several methods of causing a liquid-crystal display device having the effective display area with an aspect ratio of 16/9 to display the video signal having image information with an aspect ratio of 4/3.

For example, one known method is to sample sequentially the video signal Video with an aspect ratio of 4/3 shown in FIG. 12A sequentially all over the effective display area with an aspect ratio of 16/9 on the basis of a specific sampling clock and display the result as shown in FIG. 12B. With this method, a special circuit configuration is not needed, but the aspect ratio of the video signal with an aspect ratio of 4/3 is not be reproduced faithfully, which results in the image elongated in the direction of horizontal scanning line as shown in FIG. 12B.

Hereinafter, a method of displaying the video signal all over the effective display area is referred to as the full display mode.

Another known method is to divide the effective display area with an aspect ratio of 16/9 into a display area with an aspect ratio of 4/9 and a display area with an aspect ratio of 12/9 (=4/3) as shown in FIG. 12C or 12D and display the video signal Video having image information with an aspect ratio of 4/3 in the display area with an aspect ration of 12/9 (=4/3). Hereinafter, this display method is referred to as the left-aligned or right-aligned mode, depending on the display position.

With this method, however, since the sampling period corresponding to the display area with an aspect ratio of 12/9 (=4/3) requires at least 0.8 H for one horizontal scanning period (1 H) in the NTSC system, the sampling period corresponding to the display area with an aspect ratio of 4/9 is 0.2 H or less. Therefore, the video signal has been sampled sequentially and displayed on the basis of the video signal previously image-processed all over the effective display area by image processing techniques using a frame memory. This has prevented the device from being produced at low cost.

Under the circumstances, in Japanese Patent Application No. 9-227656, the applicant has proposed a device and method for realizing the above display easily by making the frequency of the sampling clock different in each horizontal scanning period. This display method requires no frame memory.

Furthermore, as shown in FIG. 13A, it is needed to divide the effective display area having an aspect ratio of 16/9 into a display area having an aspect ratio of 2/9 and a display area having an aspect ratio of 12/9 (=4/3), and display the video signal Video whose image information has an aspect ratio of 4/3 in the display area having an aspect ratio of 12/9 (=4/3) in such a manner the image is located in the center.

As shown in FIGS. 13B to 13D, the following display modes are needed: the left-aligned/full composite display mode, a combination of the left-aligned display mode and full display mode; the right-aligned/full composite display mode, a combination of the right-aligned display mode and full display mode; and the centering/full composite display mode, a combination of the centering display mode and full display mode.

Furthermore, as shown in FIG. 13E, the following display modes are needed: the irregular composite display mode obtained by combining the centering display mode with the full display mode irregularly (hereinafter, referred to as the centering/full irregular composite display mode); the irregular composite display mode (not shown) obtained by combining the left-aligned display mode with the full display mode (hereinafter, referred to as the left-aligned/full irregular composite display mode); and the irregular composite display mode obtained by combining the right-aligned display mode with the full display mode (hereinafter, referred to as the right-aligned/full irregular composite display mode).

In the composite display mode and irregular composite display mode, because the drive timing differs from area to area, for example, in the horizontal select period or polarity inverting timing, it has been difficult to display images without carrying out a special image process.

DISCLOSURE OF INVENTION

In view of the disadvantages described above, it is an object of the present invention to provide an image displaying method and device operable in various display modes such as composite or irregular composite display modes.

According to the present invention, there is provided an image displaying method for displaying an image on a display panel which is composed of signal lines and scanning lines crossing at right angles, pixel electrodes arrayed via switching elements near the intersections of the signal lines and scanning lines, a counter electrode facing the pixel electrodes, and an optical modulation layer arranged between the pixel electrodes and the counter electrode, wherein the image displaying method comprises the steps of: sequentially outputting a scanning pulse to the scanning lines to conduct between the signal lines and the pixel electrodes during a horizontal select period; sequentially sampling a video signal including more than one horizontal scanning period in a vertical scanning period for each specific period of the horizontal select period; and outputting the resulting pixel signal voltages to the signal lines while outputting a counter electrode voltage to the counter electrode; the image displaying method further comprises the step of: in a case where the vertical scanning period includes a first vertical scanning period for displaying of the pixel signal voltages sequentially sampled over a first period shorter than the horizontal scanning period of the video signal, and a second vertical scanning period for displaying of the pixel signal voltages sequentially sampled over a second period substantially equal to the horizontal scanning period, causing the horizontal select period to be synchronized with the second period of the second vertical scanning period.

Furthermore, according to the present invention, there is provided an image displaying device comprising: a display panel which is composed of signal lines and scanning lines crossing at right angles, pixel electrodes arrayed via switching elements near the intersections of the signal lines and scanning lines, a counter electrode facing the pixel electrodes, and an optical modulation layer arranged between the pixel electrodes and the counter electrode; a scanning line driving circuit for sequentially outputting a scanning pulse to the scanning lines to conduct between the signal lines and the pixel electrodes during a horizontal select period; a signal line driving circuit for sequentially sampling a video signal including more than one horizontal scanning period in a vertical scanning period for each specific period of the horizontal select period and outputting the resulting pixel signal voltages to the signal lines; a counter electrode driving circuit for outputting a counter electrode voltage to the counter electrode; and a control circuit section for determining the timing of the horizontal select period on the basis of an externally inputted display mode select signal, wherein in a case where a display mode is selected which allows the vertical scanning period to include a first vertical scanning period for displaying of the pixel signal voltages sequentially sampled over a first period shorter than the horizontal scanning period of the video signal, and a second vertical scanning period for displaying of the pixel signal voltages sequentially sampled over a second period substantially equal to the horizontal scanning period, the control circuit section synchronizes the horizontal select period with the second period of the second vertical scanning period.

With the above-described image displaying method and device of the invention, image display can be performed with a simple circuit configuration by effecting scanning over the vertical scanning period so as to coincide with the timing of the horizontal select period corresponding to the display area restricting the timing of the drive timing, or the horizontal select period, in a composite display mode or an irregular composite display mode.

Still furthermore, according to the present invention, there is provided an image displaying device comprising: a display panel having a display area composed of horizontal scanning lines including display pixels connected to signal lines; a signal line driving circuit section for sampling a video signal including more than one effective video period and a blanking period between the effective video periods in a vertical scanning period to produce pixel signal voltages and supplying the voltages to the signal lines for each of the horizontal scanning lines; a drive timing select circuit section for selecting one of a first timing and a second timing different from the first timing in the blanking period of the video signal; and a polarity inverting circuit section for inverting the video signal in polarity with respect to a reference voltage on the basis of one of the first and second timing selected by the drive timing select circuit section, wherein the drive timing select circuit section is arranged such that each of the first timing and the second timing is selectable when a pixel signal voltage corresponding to the first video signal is obtained from the video signal including a first video signal in the effective video period and outputted to the signal lines for each of the horizontal scanning lines.

In the image displaying device of the present invention, the drive timing select circuit is arranged such that each of the first and second timing is selectable when a pixel signal voltage corresponding to the first video signal is obtained from the video signal including the first video signal in the effective video period and outputs the voltage to the signal lines for each of the horizontal scanning lines. This makes it possible to perform image display in a composite display mode or an irregular composite display mode in which displays differing in drive timing are combined.

BEST MODE OF CARRYING OUT THE INVENTION

Hereinafter, referring to the accompanying drawings, a liquid-crystal display device according to an embodiment of the present invention will be explained.

The liquid-crystal display device of the embodiment is designed to be able to display images in the full display mode, right-aligned display mode, left-aligned display mode, centering display mode, left-aligned/full composite display mode, right-aligned/full composite display mode, centering/full composite display mode/and various irregular composite display modes.

Figure 1:
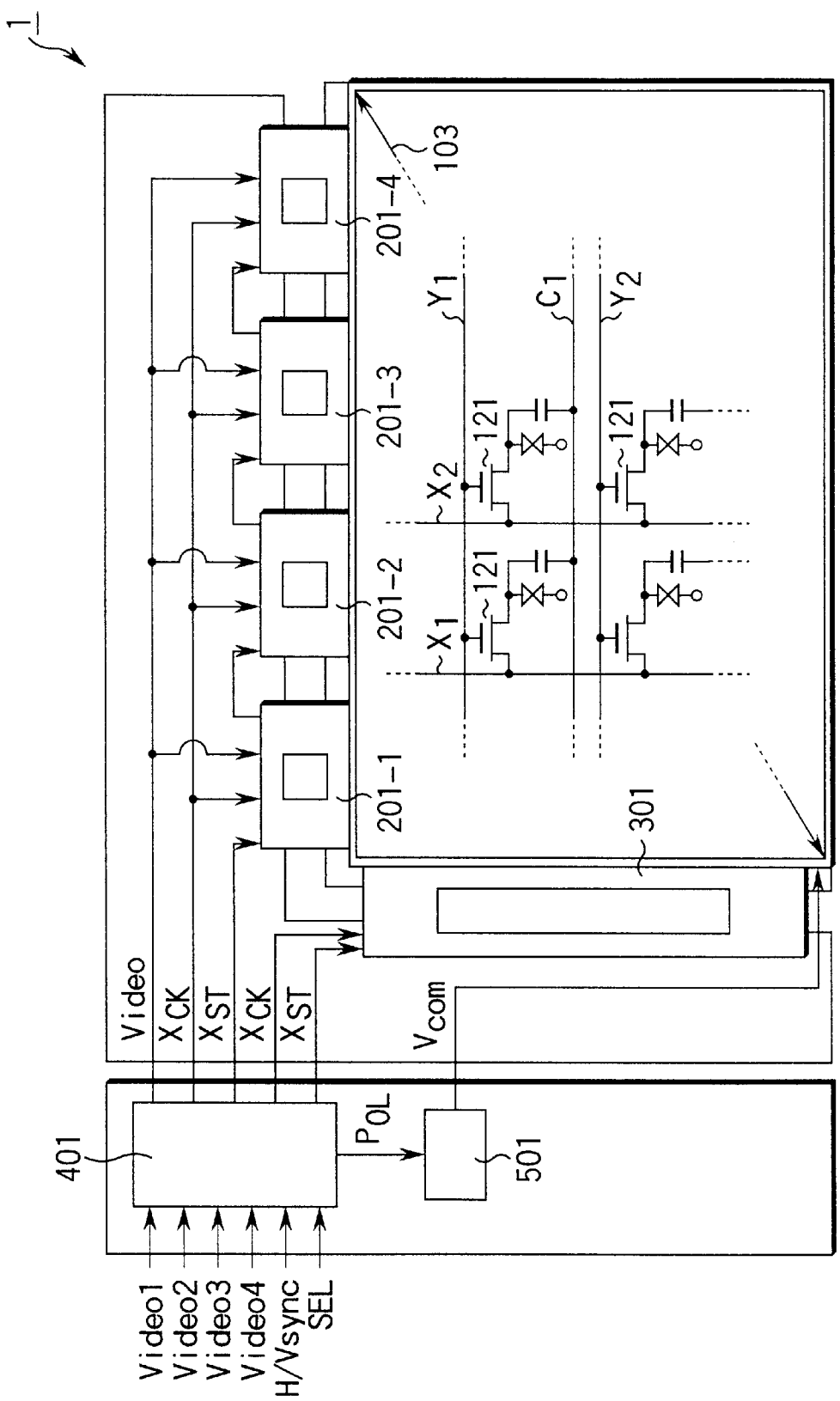
FIG. 1 schematically shows the configuration of a liquid-crystal display device according to an embodiment of the present invention.

As shown in FIG. 1, the liquid-crystal display device 1 has a 7-inch-diagonal display area 103 with an aspect ratio of 16/9 in the normally white mode, in which the display luminance peaks when no voltage is applied.

The liquid-crystal display device 1 comprises a control circuit section 401, a liquid-crystal panel 101, four X driving circuits 201-1, 201-2, 201-3, 201-4, a single Y driving circuit 301, and a counter electrode driving circuit 501 for supplying a counter electrode voltage Vcom. The four X driving circuits 201-1, 201-2, 201-3, 201-4 supply the desired image signal voltage Vsig to each signal line Xi (i=1, 2, . . . , 1440)

in each horizontal select period by sequentially sampling the video signal Video supplied from the control circuit section 401 over a horizontal select period. The Y driving circuit 301 sequentially supplies the scanning pulse VY corresponding to each horizontal select period to each scanning line Yj (j=1, 2, . . . , 240).

Figure 2:
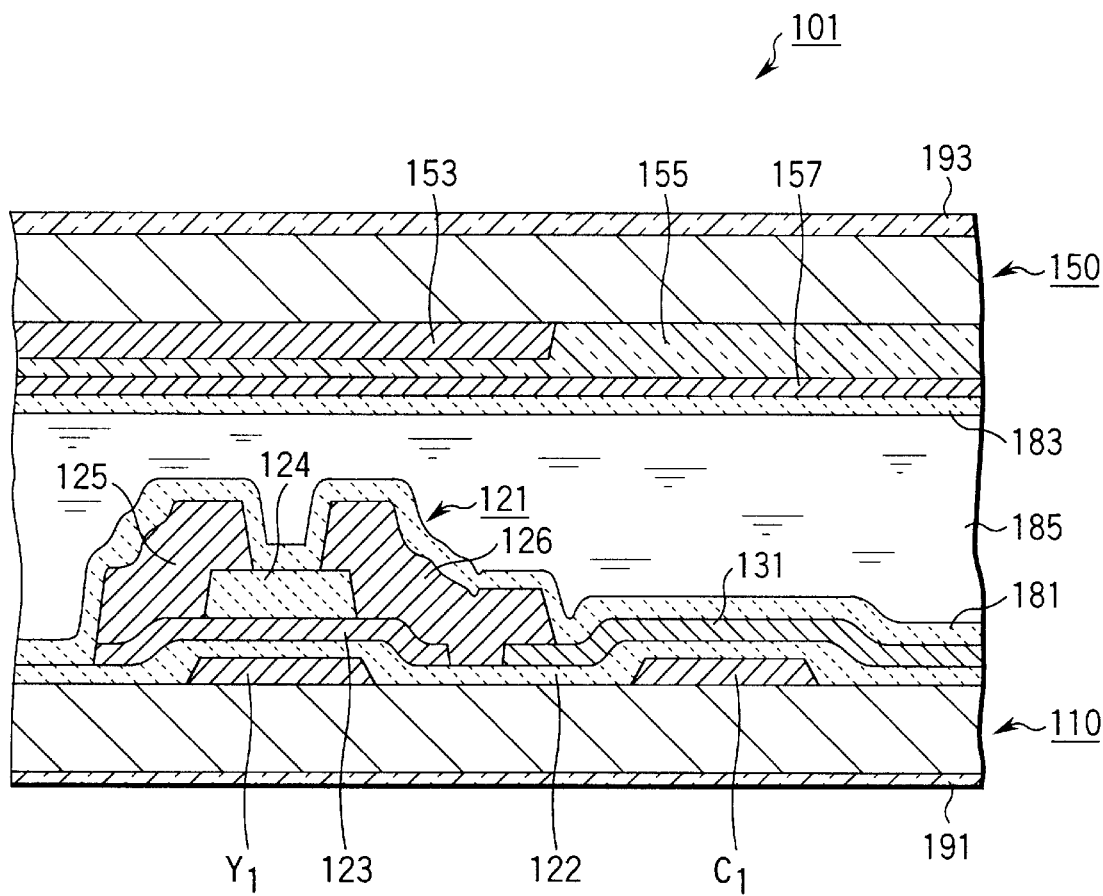
FIG. 2 is a schematic sectional view of a portion of the liquid-crystal panel of FIG. 1.

In the liquid-crystal panel 101, an array substrate 110 and a counter substrate 150 are formed to hold a twist nematic liquid-crystal layer 185 via aligned films 181, 183 respectively, and are laminated together with sealing material (not shown) as shown in FIGS. 1 and 2. On the outer surface of the substrates 110, 150, polarizing plates 191, 193 are placed in such a manner that their polarizing axes cross at right angles. In the array substrate 110, 480×3 signal lines Xi (i=1, 2, . . . , 1440) are at almost right angles to 240 scanning lines Yj (j=1, 2, . . . , 240). Near the intersections of the individual signal lines Xi and individual scanning lines Yj, reversely staggered thin film transistors 121 (hereinafter, referred to as a TFT) are formed. The scanning lines Yj themselves serve as gate electrodes and an amorphous silicon thin film formed via a gate insulating film 122 serves as an active layer 123. The TFT is formed on the active layer 123 and has a channel protective film 124, a drain electrode 125 connected to the active layer 123 and extending from the signal line Xi, and a source electrode 126 connected to the active layer. The source electrode 126 of the TFT 121 is connected to a pixel electrode 131 made of I. T. O. (Indium Tin Oxide). In the array substrate 110, auxiliary capacitance lines Cj (j=1, 2, . . . , 240) are so provided that they are almost parallel with the scanning lines Yj and have areas where they overlap with the pixel electrodes 131. The pixel electrodes 131 and auxiliary capacitance lines Cj form auxiliary capacitors Cs. The auxiliary capacitance lines Cj are electrically connected to a counter electrode driving circuit 501 (not shown).

The counter substrate 150 includes a matrix light-shielding layer 153 for shielding light directed to the TFT 121 formed on the array substrate 110, the gap between the signal line Xi and pixel electrode 131, and the gap between the scanning line Yj and pixel electrode 131, and a color filter layer 155 made up of the three primary colors, read (R), green (G), and blue (B) located between the light-shielding layers 153 to realize color display. The counter substrate 150 further includes a counter electrode 157 made of I. T. O.

The display area 103 of the liquid-crystal panel 101 includes 240 horizontal pixel lines. Each horizontal pixel line includes 480 display picture elements composed of red (R), green (G), and blue (B) display pixels.

To the control circuit section 401, first to fourth video signals Video 1 to Video 4, a horizontal/vertical synchronizing signal H/Vsync, and a screen switching signal SEL are inputted. On the basis of the screen switching signal SEL, the control circuit section 401 supplies the corresponding horizontal clock signal XCK, horizontal start signal XST, and video signal Video to the X driving circuits 201-1, 201-2, 201-3, 201-4. The control circuit section further supplies the corresponding vertical clock signal YCK and vertical start signal YST to the Y driving circuit 301 on the basis of the screen switching signal SEL and the corresponding polarity inverting signal POL to the counter electrode driving circuit 501.

Figure 3:
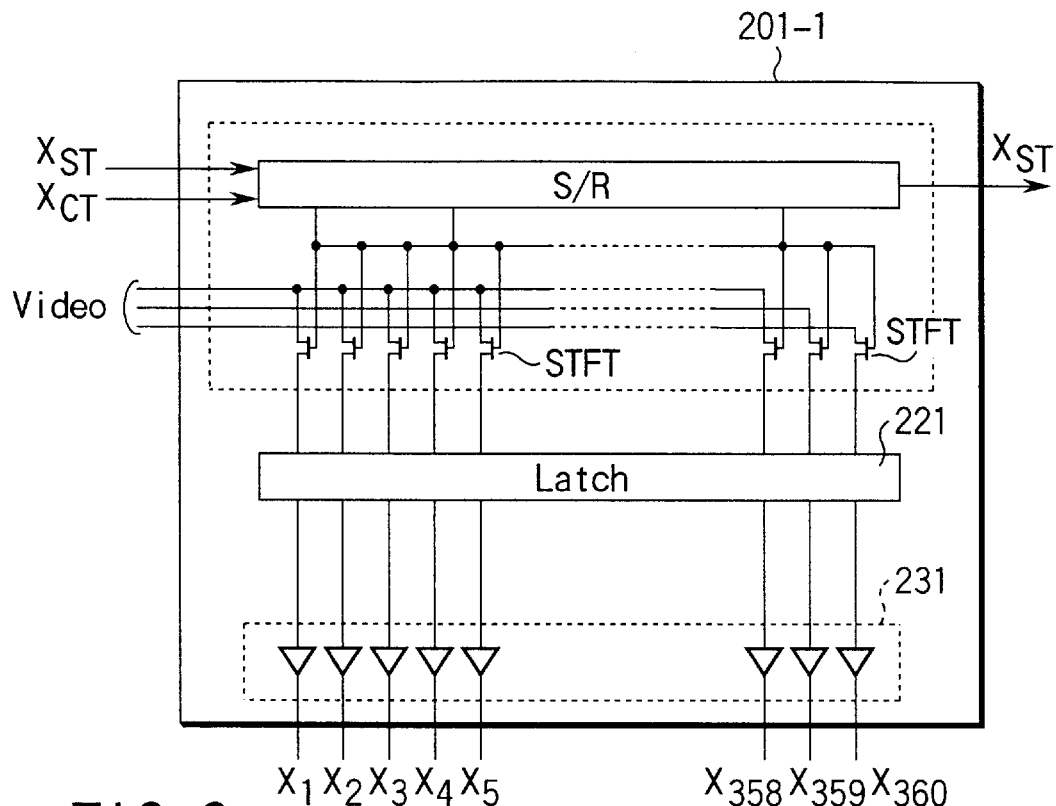
FIG. 3 schematically shows the configuration of the X driving circuit section of FIG. 1.

As shown in FIG. 3, the X driving circuit 201-1 comprises a sampling circuit 211 including a shift register S/R composed of a 120-stage flip-flop circuit that transfers the horizontal start signal XST corresponding to the screen switching signal SEL sequentially on the basis of the horizontal clock signal XCK, and sampling transistor STFTs that sample the video signal Video sequentially over each horizontal select period on the basis of the shift register S/R output, a latch circuit 221 that holds the signal voltage sampled at the sampling circuit 211, and a buffer circuit 231. The X driving circuits 201-2, 201-3, 201-4 have the same configuration and explanation of them will be omitted.

Figure 4:
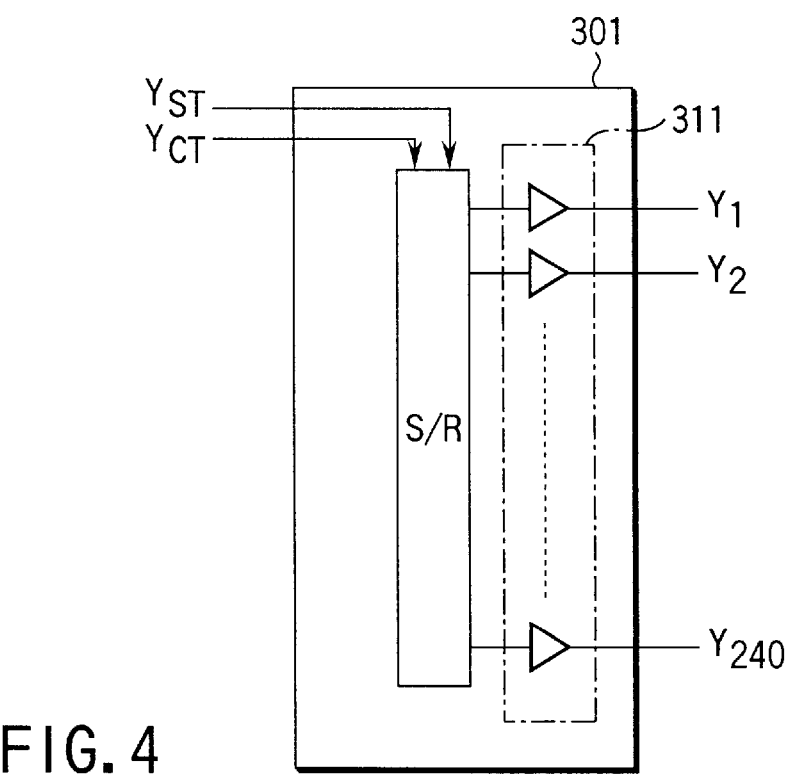
FIG. 4 schematically shows the configuration of the Y driving circuit section of FIG. 1.

As shown in FIG. 4, the Y driving circuit 301 includes a shift register S/R composed of a 240-stage flip-flop circuit that transfers the vertical start signal YST corresponding to the screen switching signal SEL sequentially on the basis of the vertical clock signal XCK and a buffer circuit 311 that converts the vertical start signal into scanning pulses VY and sequentially outputs the pulses to each scanning line Yj (j=1, 2, . . . , 240) over the horizontal select period.

The counter electrode driving circuit 501 outputs a counter electrode voltage Vcom inverted in polarity with respect to a reference voltage in synchronization with a polarity inverting signal POL. In the embodiment, the counter polarity voltage Vcom is made up of a square wave varying between 0V and 5V.

Figure 5:
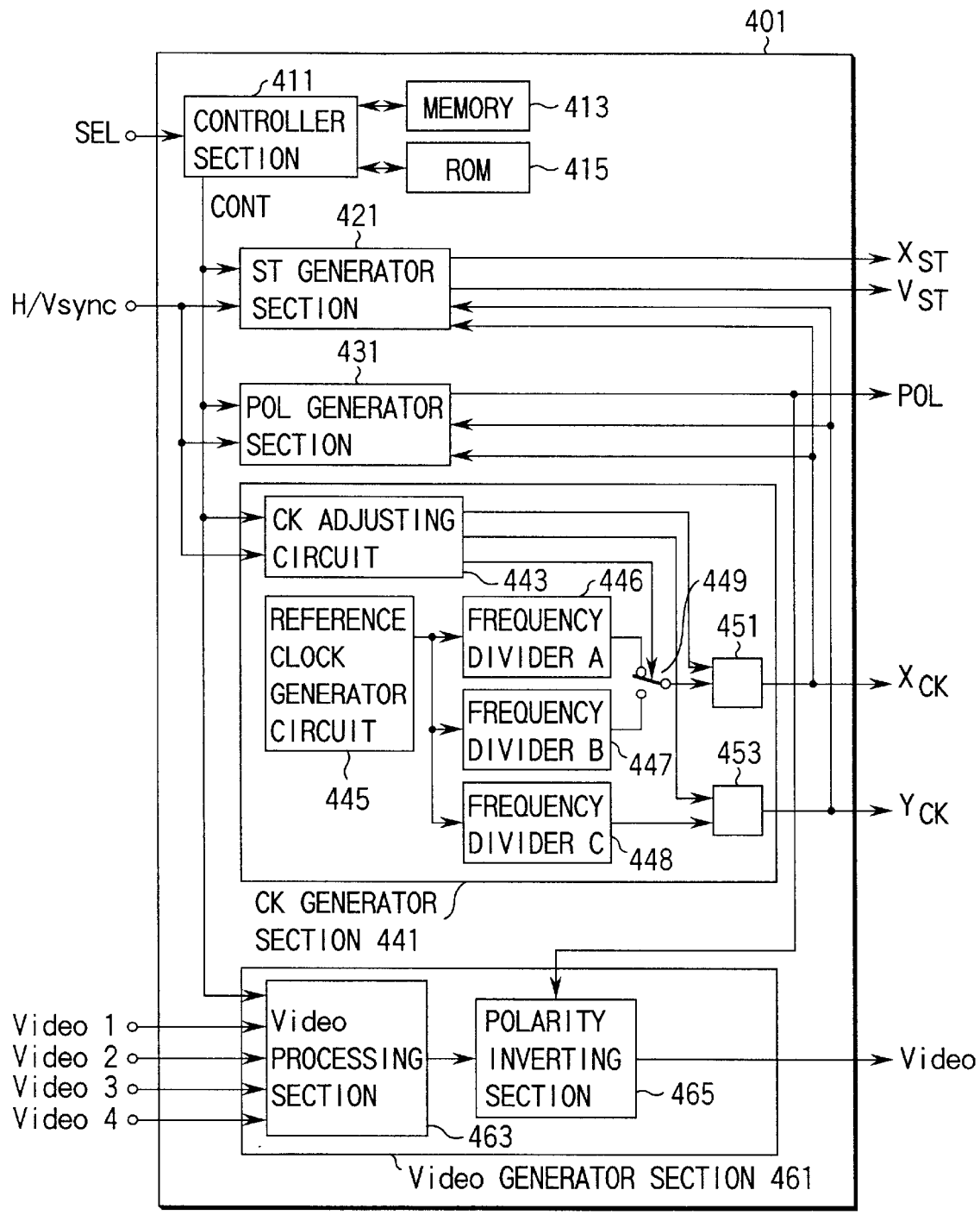
FIG. 5 schematically shows the configuration of the control circuit section of FIG. 1.

The control circuit section 401, as shown in FIG. 5, comprises a controller section 411 that outputs a control signal CONT on the basis of the inputted screen switching signal SEL, a memory 413 that holds the present mode under the control of the controller section 411, a ROM 415 that holds various display mode data items, an ST generator section 421 that generates a horizontal start signal XST and a vertical start signal YST on the basis of a horizontal/vertical synchronizing signal H/Vsync and the control signal CONT from the controller section 411, a POL generator section 431 that generates a polarity inverting signal POL on the basis of a horizontal/vertical synchronizing signal H/Vsync and the control signal CONT from the controller section 411, a CK generator section 441 that generates a horizontal clock signal XCK and a vertical clock signal YCK on the basis of a horizontal/vertical synchronizing signal H/Vsync and the control signal CONT from the controller section 411, and a Video generator section 461 that generates a video signal Video on the basis of the control signal CONT from the controller section 411.

In the embodiment, the POL generator section 431 is designed to output a video signal Video and a counter electrode voltage Vcom which are inverted in polarity in each horizontal scanning period to decrease flickers. The phase of the video signal Video is 180° out-of-phase with the phase of the counter electrode voltage Vcom to lower the withstand voltage of each driving circuit.

The Video generator section 461 includes a Video processing section 463 that combines the inputted first to fourth video signals Video 1 to Video 4 on the basis of the control signal CONT from the controller section 411 corresponding to the display mode and a polarity inverting section 465 that outputs the output from the Video processing section 463 as a video signal Video whose polarity has been inverted with respect to a reference voltage in synchronization with the polarity inverting signal POL. As described above, in the embodiment, to decrease flickers, the video signal Video inverted in polarity in each horizontal select period is outputted.

The CK generator section 441 comprises a reference clock generator circuit 445 that generate a reference clock Ckref, frequency dividers (A, B, C) 446, 447, 448 that divide the reference clock CKref in a specific ratio, a CK adjusting circuit 443 that outputs a frequency divider switching signal SWCK for selecting the output of either the frequency divider (A) 446 or frequency divider (B) 447, a clock select circuit 449 that selectively outputs a clock on the basis of the frequency divider switching signal SWCK, a phase adjusting section 451 that adjusts the phase of the output from the clock select circuit 449, and a phase adjusting section 453 that adjusts the phase of the output from the frequency divider (C) 448.

Additionally, the liquid-crystal display device 1 further comprises a counter electrode driving circuit (not shown) that supplies a counter electrode voltage Vcom to the counter electrode 157. The counter electrode voltage Vcom is inverted in polarity with respect to the reference voltage so as to have the opposite phase to that of the video signal Video, on the basis of the polarity inverting signal POL from the control circuit section 401. This lowers the withstand voltage of the X driving circuits 201-1, 201-2, 201-3, and 201-4.

Figure 12A:
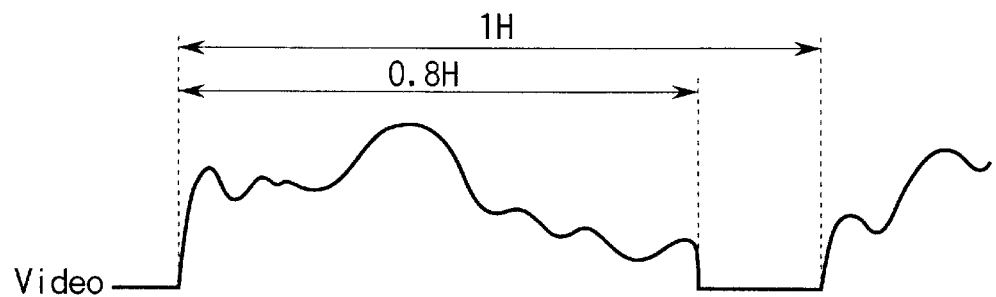
FIGS. 12A to 12D are drawings for explaining various displaying states.
Figure 12B:
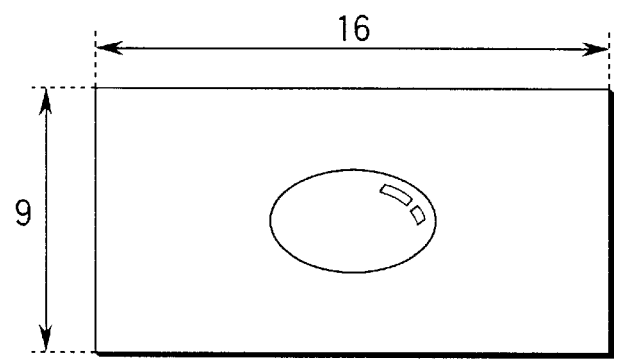

Next, referring to the drawings, the operation of the liquid-crystal display device 1 will be explained in detail.
Full display mode First, the full display mode will be explained. In the full display mode, the video signal Video 1 in the NTSC system with an aspect ratio of 4/3 is displayed all over the display area 103 of the liquid-crystal display device 1 as shown in FIG. 12B.

Figure 6:
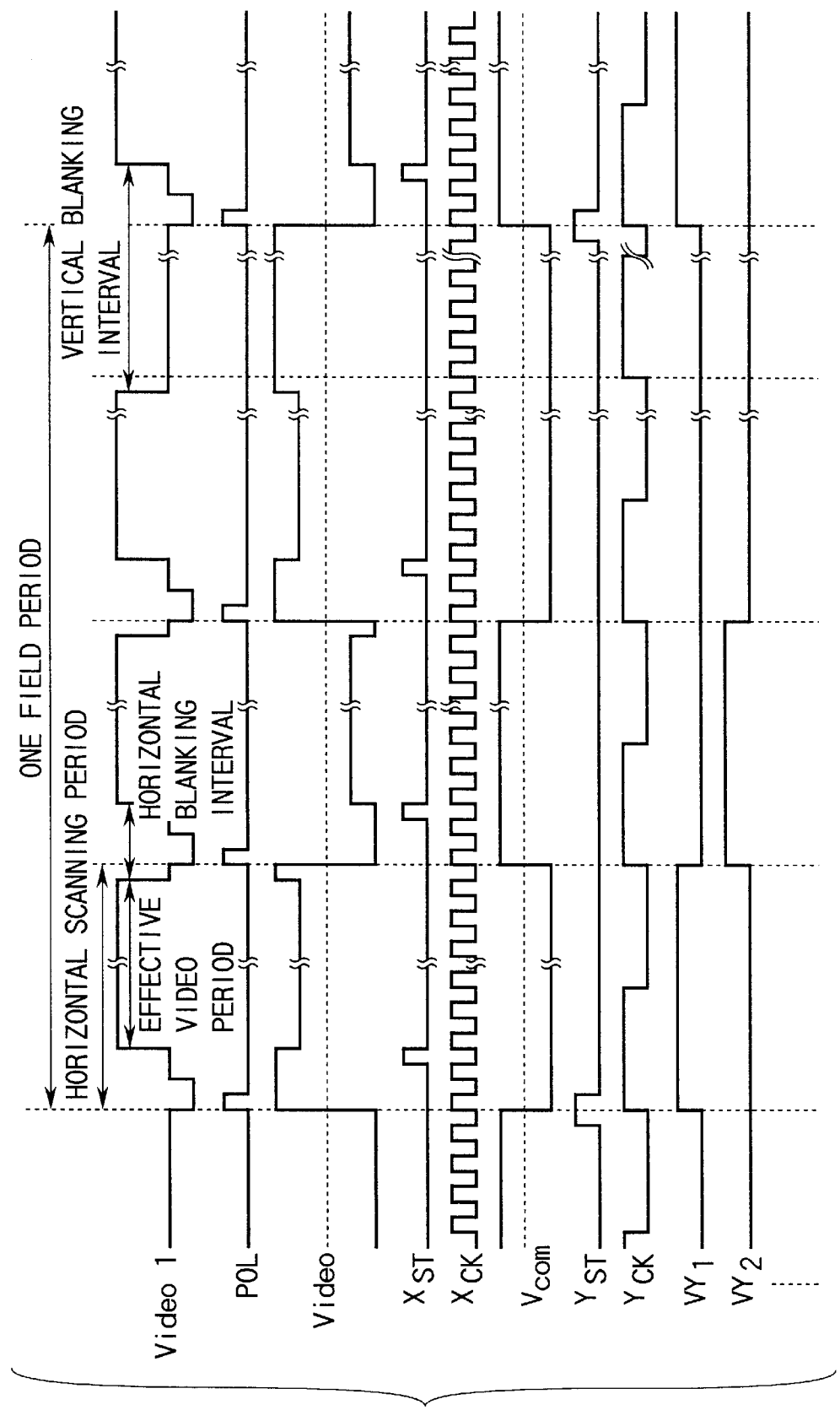
FIG. 6 is a diagram for explaining waveforms in the full display mode.
Figure 7:
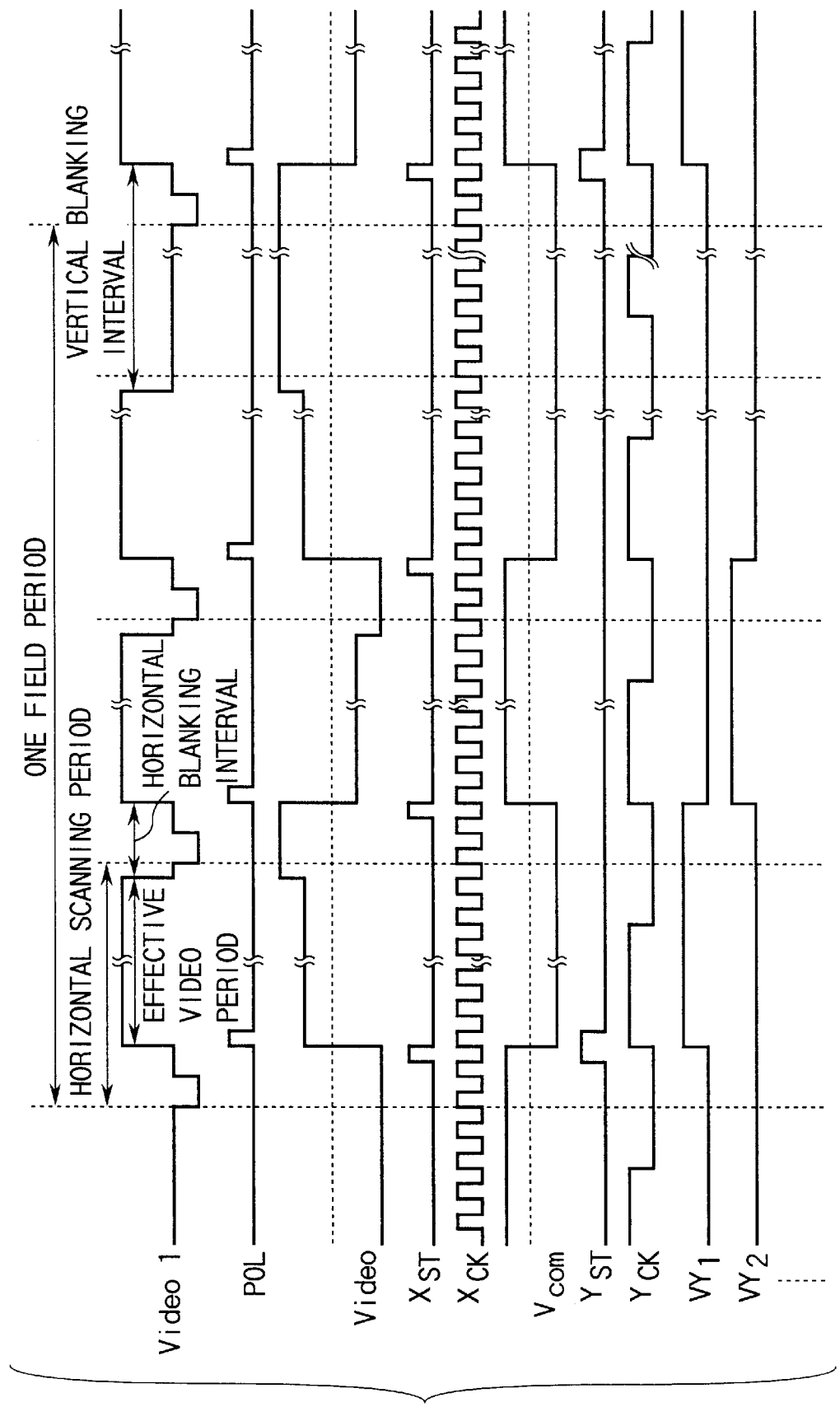
FIG. 7 is a diagram for explaining another waveforms in the full display mode.
Figure 8:
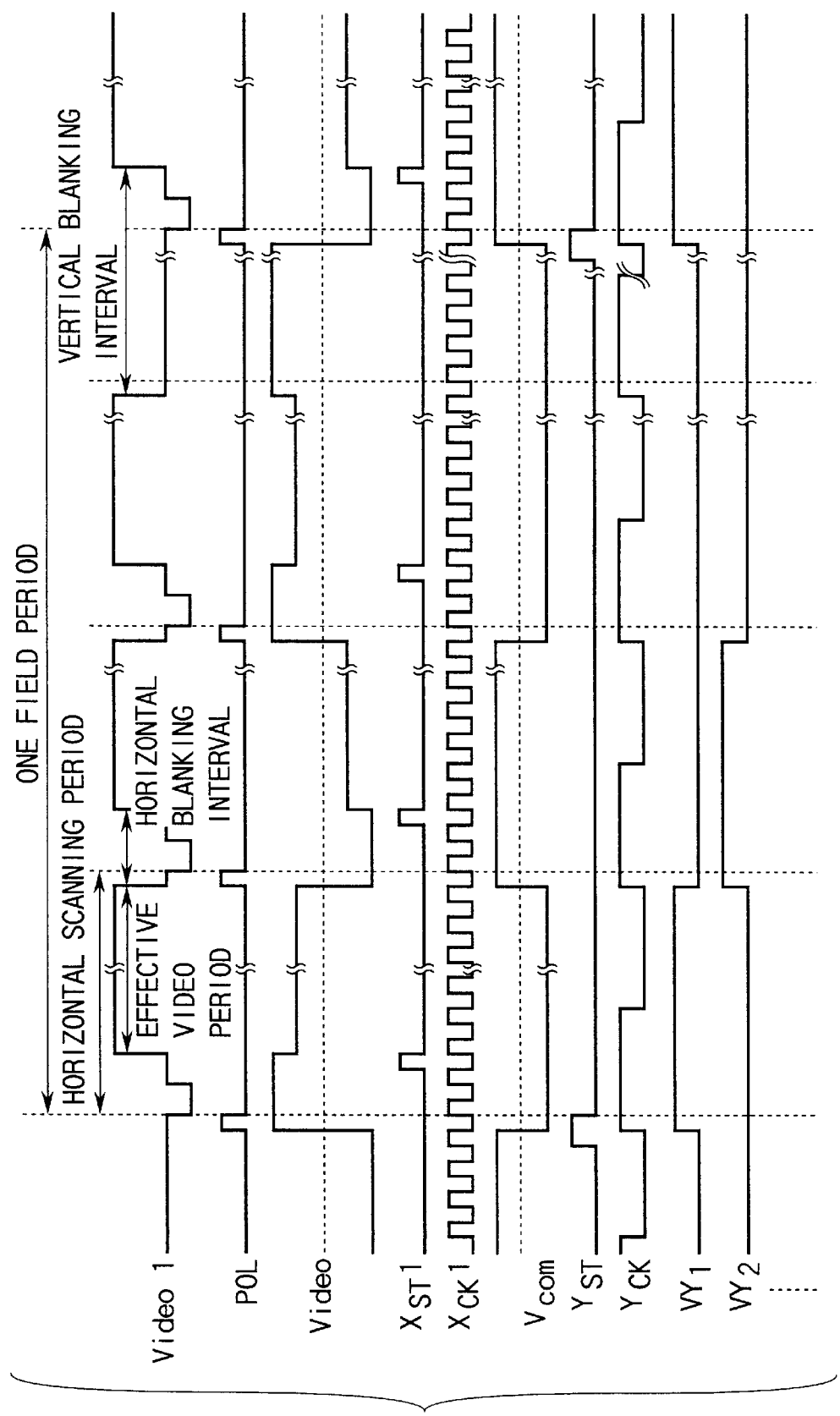
FIG. 8 is a diagram for explaining still another waveforms in the full display mode.

The liquid-crystal display device 1 has three types of driving timing in the full display mode. Referring to FIGS. 6 to 8, the three types of drive timing will be explained. The driving waveforms in FIGS. 6 to 8 show driving waveforms for a black raster display.

First, the drive timing for the basic full display mode 1 will be described by reference to FIG. 6.

The video signal Video 1, as shown in FIG. 6, includes more than one horizontal scanning period in one field (vertical scanning) period. Each horizontal scanning period includes an effective video period. The time interval between effective video periods is a horizontal blanking period.

Here, when the screen switching signal SEL has specified the full display mode, the controller section 411 acquires the data corresponding to the full display mode from the ROM 415 and outputs the control signal CONT.

The POL generator section 431 generates a polarity inverting signal POL on the basis of the control signal CONT and the horizontal/vertical synchronizing signal H/Vsync. The polarity inverting signal POL is set in synchronization with each horizontal scanning period of the video signal Video 1.

The Video processing section 463 of the Video generator section 461 outputs the video signal Video 1 without combining the video signals according to the control signal CONT based on the full display mode. The polarity inverting section 465 generates the video signal Video whose polarity is inverted with respect to the reference voltage in synchronization with the polarity inverting signal POL and outputs the video signal Video.

Similarly, on the basis of the polarity inverting signal POL, the counter electrode driving circuit 501 outputs a counter electrode voltage Vcom inverted in polarity with respect to the reference voltage so as to have the opposite phase to that of the video signal Video.

The ST generator section 421 generates the horizontal start signal XST and vertical start signal VST shown in FIG. 6 on the basis of the control signal CONT and horizontal/vertical synchronizing signal H/Vsync. The horizontal start signal XST lies in the horizontal blanking period corresponding to the effective video period in each horizontal scanning period and is so controlled that it is located behind a specific horizontal clock after a specific time has elapsed in the horizontal scanning period. The vertical start signal VST is set in the vertical blanking period corresponding to each field period.

The CK adjusting circuit 443 selects the output from the frequency divider (A) 446 on the basis of the control signal CONT and horizontal/vertical synchronizing signal H/Vsync and outputs the selected output as a horizontal clock signal XCK.

The X driving circuits 201-1, . . . , 201-4 generate the sampling clocks corresponding to the effective video period on the basis of the horizontal start signal XST and horizontal clock signal XCK, sample the video signal Video in the effective video period sequentially, and output the image signal voltages Vsig to the signal lines x1, X2 . . . .

The Y driving circuit 301 outputs scanning pulses VY1, VY2, . . . synchronizing with the horizontal scanning period of the video signal Video 1 to the scanning lines Y1, Y2, . . . , respectively on the basis of the vertical clock signal VCK and vertical start signal VST. This causes the image signal voltage Vsig to be written onto the corresponding pixel electrode 131. On the basis of the potential difference with the counter electrode voltage Vcom, the image is displayed.

As described above, in the full display mode 1, the polarity inversion of the video signal Video and counter electrode voltage Vcom is in synchronization with the polarity inverting signal POL synchronizing with the horizontal scanning period of the video signal Video 1. The horizontal select period of each scanning pulse VY is also in synchronization with the horizontal scanning period of the video signal Video 1.

Next, another type of the drive timing in the full display mode will described by reference to FIG. 7. The full display mode 2 differs from the full display mode 1 in the timing of the polarity inverting signal POL and vertical start signal VST.

Specifically, the POL generator section 431 synchronizes with the effective video period of each horizontal scanning period, or is almost in synchronization with the start position of the effective video period, and generates a polarity inverting signal POL lying in the horizontal blanking period behind a specific number of horizontal clocks after a specific time has elapsed since the horizontal scanning period of the video signal Video 1 was started. Accordingly, the polarity inversion of the video signal Video and counter electrode voltage Vcom is also effected in synchronization with the timing of the polarity inverting signal POL.

Similarly, the vertical start signal VST is in synchronization with the timing of the polarity inverting signal POL. As a result, the horizontal select period of the liquid-crystal display device 1 has such timing as is a specific number of horizontal clocks behind the horizontal scanning period of the video signal Video 1 as shown in FIG. 7.

As described above, in the full mode 2, the polarity inversion of the video signal Video and counter electrode voltage Vcom is based on the polarity inverting signal POL synchronizing with the effective video period of the video signal Video 1. The horizontal select period of each scanning pulse VY is in synchronization with the effective video period of the video signal Video 1.

Next, still another type of the drive timing in the full display mode will be described by reference to FIG. 8. The full display mode 3 differs from the full display modes 1 and 2 in the timing of the polarity inverting signal POL and vertical start signal VST.

Specifically, the POL generator section 431 synchronizes with the end position of the effective video period of each horizontal scanning period, or the horizontal blanking period, and generates the polarity inverting signal POL lying in a horizontal blanking period ahead of a specific number of horizontal clocks and a specific time before each horizontal scanning period. Accordingly, the polarity inversion of the video signal Video and counter electrode voltage Vcom is also effected in synchronization with the timing of the polarity inverting signal POL.

Similarly, the vertical start signal VST is in synchronization with the polarity inverting signal POL. As a result, the horizontal select period of the liquid-crystal display device 1 has such timing as is a specific number of horizontal clocks in front of the horizontal scanning period of the video signal Video as shown in FIG. 8.

As described above, in the full display mode 3, the polarity inversion of the video signal Video and counter electrode voltage Vcom is based on the polarity inverting signal POL synchronizing with the horizontal blanking period of the video signal Video 1. The horizontal select period of each scanning pulse VY is also in synchronization with the horizontal blanking period of the video signal Video 1.

As described above, in the liquid-crystal display device 1, the full display modes have three types of drive timing in terms of the horizontal select period and polarity inversion timing.

Left-aligned display mode

Figure 12C:
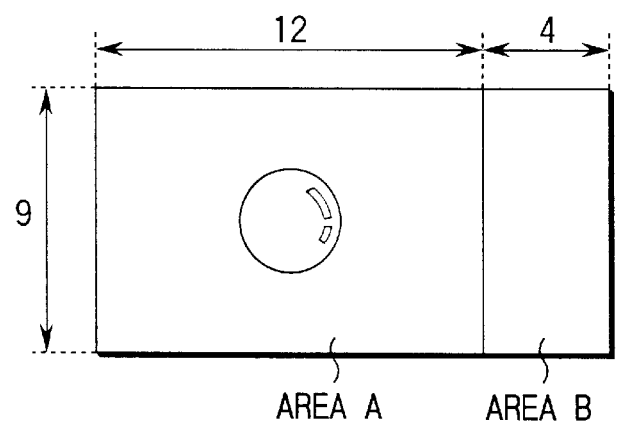

Next, the left-aligned display mode will be described by reference to FIG. 9. In the left-aligned display mode, the video signal Video 1 in the NTSC system with an aspect ratio of 4/3 is displayed, with the aspect ratio unchanged, in area A with an aspect ration of 4/3 and the video signal 2 is displayed in area B with an aspect ratio of 4/9 as shown in FIG. 12C.

In the video signal Video 1, more than one horizontal scanning period is included in one field period and an effective video period is included in each horizontal scanning period as described above. The time interval between effective video periods is a horizontal blanking period. The video signal Video 2 has an effective video period corresponding to the blanking period of the video signal Video 1.

When the screen switching signal SEL specifies the left-aligned display mode, the controller section 411 acquires the data corresponding to the left-aligned display mode from the ROM 415 and outputs the control signal CONT.

In addition, the controller 411 compares the acquired data with the present display mode held in the memory 413 and updates the data held in the memory 413. When the full display mode 1 or 3 is held in the memory 413 as the present display mode, the controller section 411 sets the change of the display mode in the vertical blanking period to prevent a faulty display from being made in changing the mode. When the full display mode 2 is held, the controller section sets the change of the display mode in the horizontal blanking period immediately.

Figure 9:
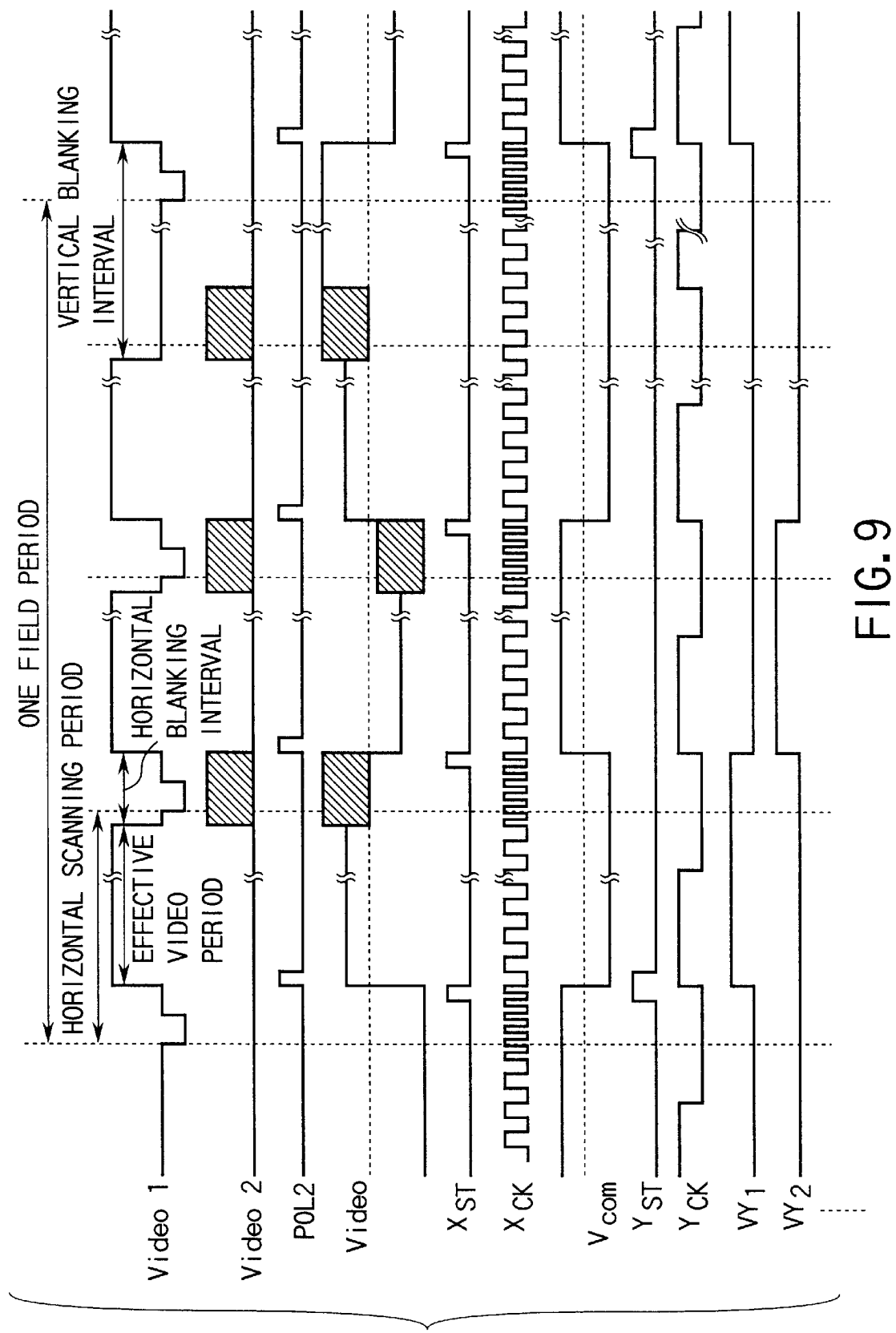
FIG. 9 is a diagram for explaining waveforms in the left-aligned display mode.

The ST generator section 421 generates a horizontal start signal XST and vertical start signal VST shown in FIG. 9 on the basis of the control signal CONT and horizontal/vertical synchronizing signal H/Vsync. The horizontal start signal XST and vertical start signal VST have the same timing as that of the full display mode 2 shown in FIG. 7.

The POL generator section 431 generates a polarity inverting signal POL having the same drive timing as that of the full display mode 2 in FIG. 7 on the basis of the control signal CONT and horizontal/vertical synchronizing signal H/Vsync.

On the basis of the control signal CONT and horizontal/vertical synchronizing signal H/Vsync, the CK adjusting circuit 443 selects the output from the frequency divider (A) 446 in the effective video period of each horizontal scanning period of the video signal Video 1 and the output from the frequency divider (B) 447 in the blanking period of the video signal Video 1 and outputs the selected output as a horizontal clock signal XCK.

The Video processing section 463 of the Video generator section 461 allocates a video signal Video 2 in the blanking period of the video signal Video 1 on the basis of the control signal CONT and polarity inverting signal POL. Then, the polarity inverting section 465 outputs a video signal Video inverted in polarity with respect to the reference voltage in synchronization with the polarity inverting signal POL. The polarity inverting signal POL also controls the inversion of the polarity of the counter electrode voltage Vcom.

The X driving circuits 201-1, . . . , 201-4 generate sampling clocks in the effective video period and horizontal blanking period on the basis of the horizontal start signal XST and horizontal clock signal XCK, sample the video signal Video sequentially, and output the image signal voltages Vsig to the signal lines X1, X2, . . . .

The Y driving circuit 301 outputs scanning pulses VY1, VY2, . . . synchronizing with the effective video period of the video signal Video 1 to the scanning lines Y1, Y2, . . . , respectively on the basis of the vertical clock signal VCK and vertical start signal VST. This causes the image signal voltage Vsig to be written onto the corresponding pixel electrode 131. On the basis of the potential difference with the counter electrode voltage Vcom, the image is displayed.

As described above, in the left-aligned display mode 1, the same drive timing as that of the full display mode 2 has been set.

Right-aligned display mode

Figure 12D:
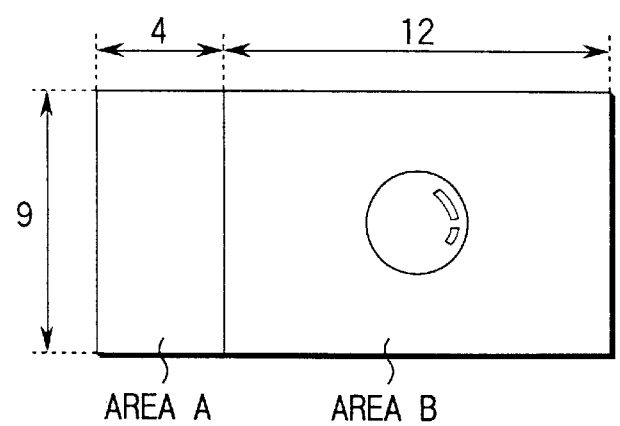

Next, the right-aligned display mode will be described by reference to FIG. 10. In the right-aligned display mode, the video signal Video 1 in the NTSC system with an aspect ratio of 4/3 is displayed with the aspect ratio unchanged, in area B with an aspect ration of 4/3 and the video signal Video 3 is displayed in area A with an aspect ratio of 4/9 as shown in FIG. 12D.

In the video signal Video 1, more than one horizontal scanning period is included in one field period and an effective video period is included in each horizontal scanning period as described above. The time interval between effective video periods is a horizontal blanking period. The video signal Video 3 has an effective video period corresponding to the blanking period of the video signal Video 1.

When the screen switching signal SEL has specified the right-aligned display mode, the controller section 411 acquires the data corresponding to the right-aligned display mode from the ROM 415 and outputs the control signal CONT.

When the screen switching signal SEL has specified the right-aligned display mode, the controller section 411 compares the acquired data with the present display mode held in the memory 413 and updates the data held in the memory 413.

When the full display mode 1 or 2 is held in the memory 413 as the present display mode, the controller section 411 sets the change of the display mode in the vertical blanking period to prevent a faulty display from being made in changing the mode. When the full display mode 3 is held, the controller section sets the change of the display mode in the horizontal blanking period immediately.

Figure 10:
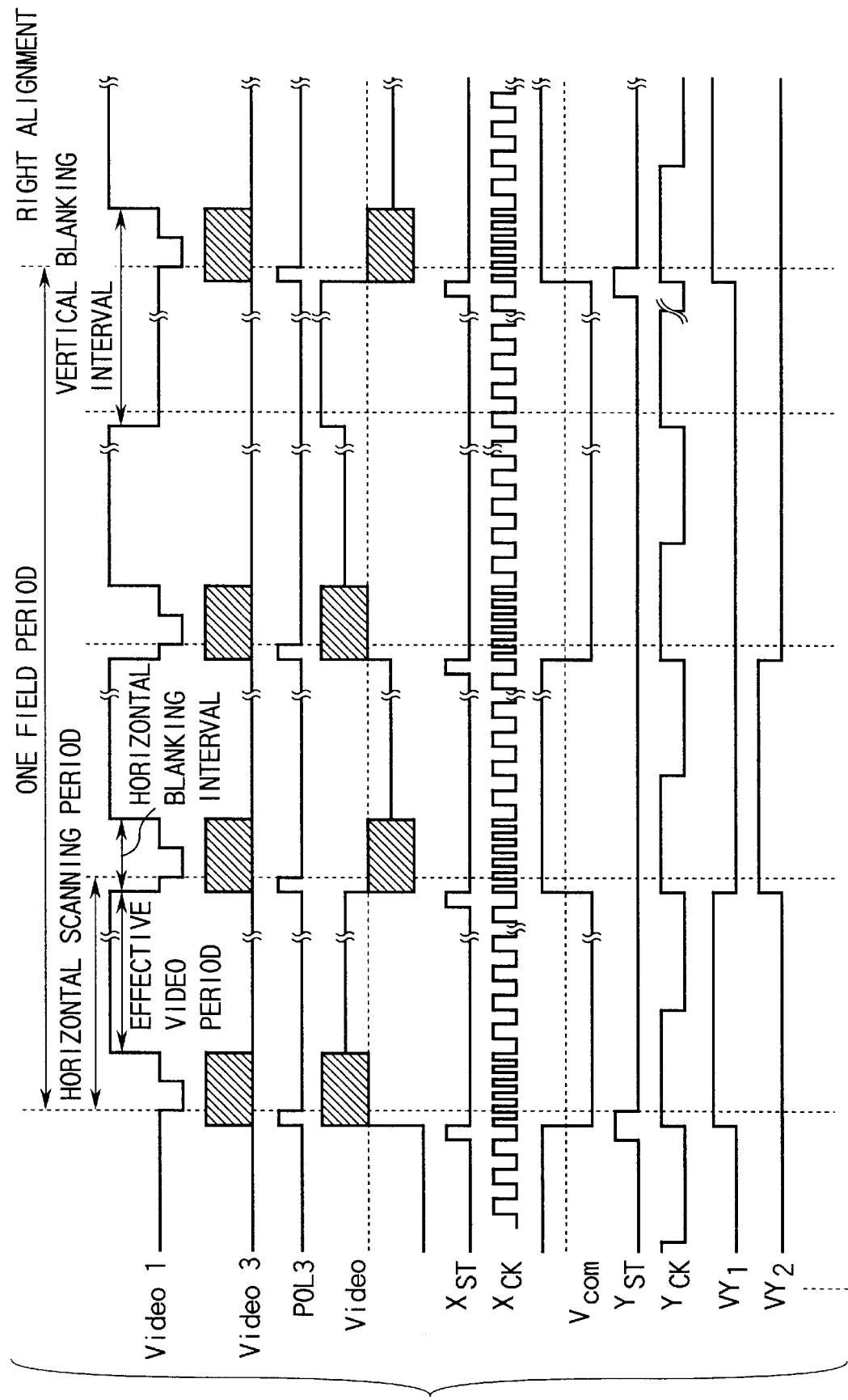
FIG. 10 is a diagram for explaining waveforms in the right-aligned display mode.

The ST generator section 421 generates a horizontal start signal XST and vertical start signal VST shown in FIG. 10 on the basis of the control signal CONT and horizontal/vertical synchronizing signal H/Vsync. The horizontal start signal XST is in synchronization with the end position of the effective video period of each horizontal scanning period of the video signal Video 1 and with the blanking period and is set so as to lie in the horizontal blanking period a specific number of horizontal clocks ahead of and a specific time before each horizontal scanning period. The vertical start signal VST has the same drive timing as that of the full display mode 3 shown in FIG. 8.

The POL generator section 431 generates a polarity inverting signal POL having the same drive timing as that of the full display mode 3 in FIG. 8 on the basis of the control signal CONT and horizontal/vertical synchronizing signal H/Vsync.

On the basis of the control signal CONT and horizontal/vertical synchronizing signal H/Vsync, the CK adjusting circuit 443 selects the output from the frequency divider (A) 449 in the effective video period of each horizontal scanning period of the video signal Video 1 and the output from the frequency divider (B) 447 in the blanking period of the video signal Video 1 and outputs the selected output as a horizontal clock signal XCK.

The Video generator section 461 allocates a video signal Video 3 to the blanking period of each horizontal scanning period of the video signal Video 1 on the basis of the control signal CONT and polarity inverting signal POL and outputs the video signal Video inverted in polarity with respect to the reference voltage on the basis of the polarity inverting signal POL. The polarity inverting signal POL also controls the inversion of the polarity of the counter electrode voltage Vcom.

The X driving circuits 201-1, . . . , 201-4 generate sampling clocks in the horizontal blanking period and effective video period on the basis of the horizontal start signal XST and horizontal clock signal XCK, sample the video signal Video sequentially, and output the image signal voltages Vsig to the signal lines X1, X2, . . . .

The Y driving circuit 301 outputs scanning pulses VY1, VY2, . . . synchronizing with the end of the effective video period of the video signal Video 1 and the horizontal blanking period to the scanning lines Y1, Y2, . . . , respectively on the basis of the vertical clock signal VCK and vertical start signal VST. This causes the image signal voltage Vsig to be written onto the corresponding pixel electrode 131. On the basis of the potential difference with the counter electrode voltage Vcom, the image is displayed.

As described above, in the right-aligned display mode, the same drive timing as that of the full display mode 3 has been set.

Centering display mode

Figure 13A:
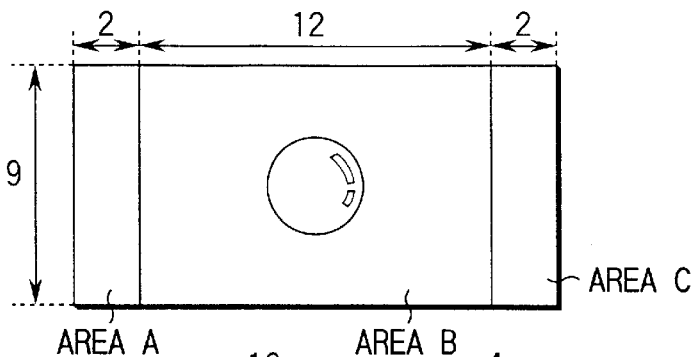
FIGS. 13A to 13E are drawings for explaining various displaying states.

Next, the centering display mode will be described by reference to FIG. 11. In the centering display mode, the video signal in the NTSC system with an aspect ratio of 4/3 is displayed in the center of the display area 103, with the aspect ratio unchanged as shown in FIG. 13A.

The video signal in the NTSC system corresponding to area B with an aspect ratio of 4/3 is inputted as the video signal Video 1, the video signal corresponding to area A with an aspect ratio of 2/9 as the video signal Video 2, and the video signal corresponding to area C with an aspect ratio of 2/9 as the video signal Video 3.

When the screen switching signal SEL has specified the centering display mode, the controller section 411 compares the data with the present display mode held in the memory 413 and updates the data held in the memory 413.

When the full display mode 2 or 3 is held in the memory 413 as the present display mode, the controller section 411 sets the change of the display mode in the vertical blanking period to prevent a faulty display from being made in changing the mode. When the full display mode 1 is held, the controller section sets the change of the display mode in the horizontal blanking period immediately.

Then, the controller section 411 acquires the data corresponding to the centering display mode from the ROM 415 and outputs the corresponding control signal CONT.

Figure 11:
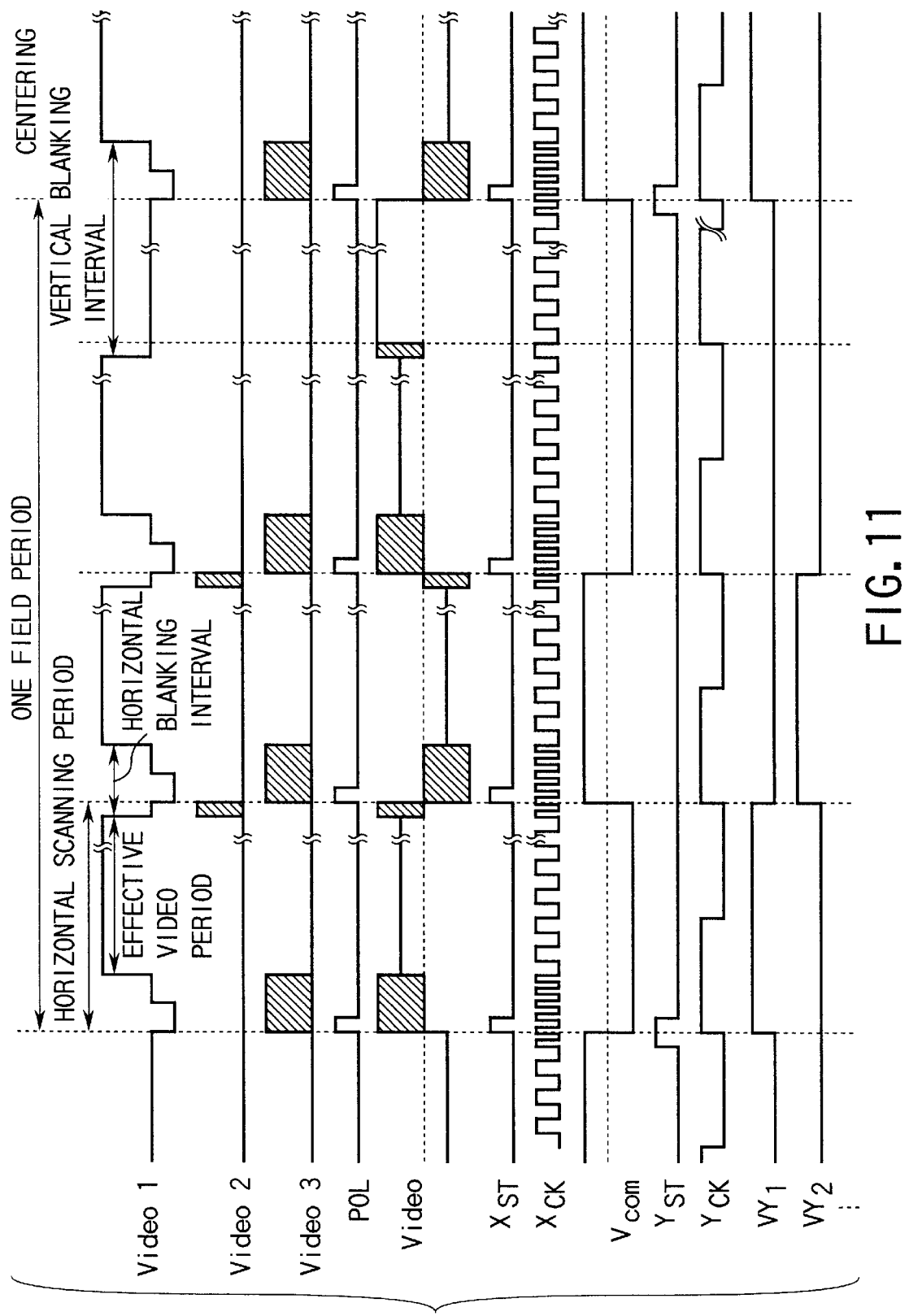
FIG. 11 is a diagram for explaining waveforms in the centering display mode.

The ST generator section 421 generates a horizontal start signal XST and vertical start signal VST shown in FIG. 11 on the basis of the control signal CONT and horizontal/vertical synchronizing signal H/Vsync. The horizontal start signal XST is set in synchronization with the start position of each horizontal scanning period. The vertical start signal VST has the same drive timing as that of the full display mode 1 shown in FIG. 6.

The POL generator section 431 generates a polarity inverting signal POL having the same drive timing as that of the full display mode 1 in FIG. 6 on the basis of the control signal CONT and horizontal/vertical synchronizing signal H/Vsync.

On the basis of the control signal CONT and horizontal/vertical synchronizing signal H/Vsync, the CK adjusting circuit 443 selects the output from the frequency divider (A) 446 in the effective video period of each horizontal scanning period of the video signal Video 1 and the output from the frequency divider (B) 447 in the blanking period of the video signal Video 1 and outputs the selected output as a horizontal clock signal XCK.

The Video generator section 461 allocates the video signals Video 2 and Video 3 to the blanking period of each horizontal scanning period of the video signal Video 1 on the basis of the control signal CONT and polarity inverting signal POL and outputs the video signal Video inverted in polarity with respect to the reference voltage on the basis of the polarity inverting signal POL. The polarity inverting signal POL also controls the inversion of the polarity of the counter electrode voltage Vcom.

The X driving circuits 201-1, . . . , 201-4 generate the sampling clocks in the horizontal blanking period and effective video period on the basis of the horizontal start signal XST and horizontal clock signal XCK, sample the video signal Video sequentially, and output the image signal voltage Vsig to the signal lines X1, X2, . . . .

The Y driving circuit 301 outputs scanning pulses VY1, VY2, . . . almost synchronizing with the horizontal scanning period of the video signal Video 1 to the scanning lines Y1, Y2, . . . , respectively on the basis of the vertical clock signal VCK and vertical start signal VST. This causes the image signal voltage Vsig to be written onto the corresponding pixel electrode 131. On the basis of the potential difference with the counter electrode voltage Vcom, the image is displayed.

As described above, in the centering display mode, the same drive timing as that of the full display mode 1 has been set.

Composite/irregular composite display mode

Next, the composite or irregular composite display modes shown in FIGS. 13B to 13E will be explained.

As described above, in the embodiment, the full display mode has three types of drive timing. Namely, there are fewer restrictions on the drive timing, including the drive timing in the horizontal select period and the polarity inverting timing. Specifically, the full display mode has the drive timing, including the horizontal select period and polarity inverting timing, corresponding to each of the left-aligned, right-aligned, and centering display modes.

Therefore, in the composite display mode or irregular composite display mode, various composite display modes or irregular composite display modes can be dealt with without changing the drive timing, including the horizontal select period and polarity inverting timing, in the vertical scanning period. This is done by determining the drive timing, including the horizontal period and polarity inverting timing, giving priority to the drive timing of the left-aligned, right-aligned, and centering display modes in which the drive timing, including the horizontal period and polarity inverting timing, is determined uniquely, and by deciding the drive timing of the full density mode on the basis of the determined timing.

Figure 13B:
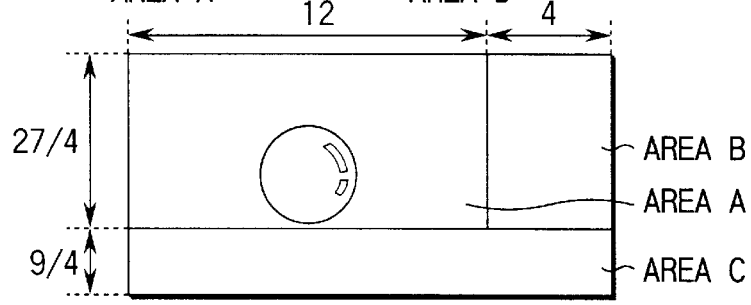

First, the left-aligned/full composite display mode shown in FIG. 13B will be explained.

When the screen switching signal SEL has specified the left-aligned/full composite display mode, the controller section 411 compares the data with the present display mode held in the memory 413 and updates the data held in the memory 413.

Then, the controller section 411 acquires the data corresponding to the left-aligned/full composite display mode from the ROM 415 and outputs the corresponding control signal CONT. Specifically, the control signal CONT controls the ST generator section 421, POL generator section 431, CK generator section 441, and Video generator section 461 in such a manner that the representations on area A and area B are controlled with the drive timing of the left-aligned display mode. As for area c, the drive timing of the full display mode 2 is selected because of restrictions on the drive timing of the left-aligned display mode and the ST generator section 421, POL generator section 431, CK generator section 441, and Video generator section 461 are controlled.

Specifically, since the left-aligned display mode and full display mode 2 have the same polarity inverting signal POL, vertical start signal VST, and vertical clock signal VCK, the horizontal select period and the polarity inverting timing of the video signal Video and counter electrode voltage Vcom in the former mode coincide with those in the latter mode in the liquid-crystal display device 1. This makes it possible to combine the left-aligned display mode with the full display mode 2 to display images in the left-aligned/full composite display mode.

Figure 13C:
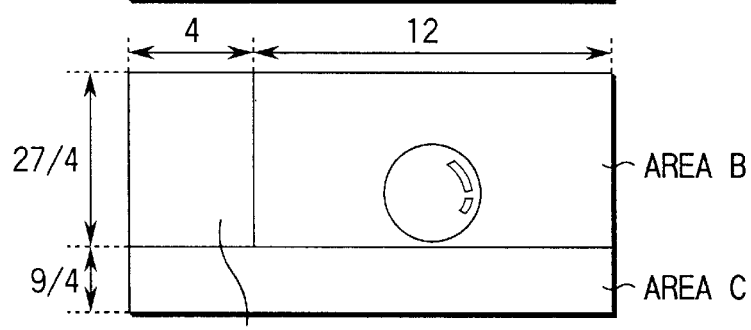

Similarly, in the right-aligned/full composite display mode shown in FIG. 13C, the representations on area A and area B are controlled with the drive timing of the right-aligned display mode on the basis of the control signal CONT from the controller section 411. Because of restrictions on the drive timing of the right-aligned display mode, the drive timing of the full display mode 3 is selected and area C is controlled with this timing.

Specifically, since the right-aligned display mode and full display mode 3 have the same polarity inverting signal POL, vertical start signal VST, and vertical clock signal VCK, the horizontal select period and the polarity inverting timing of the video signal Video and counter electrode voltage Vcom in the former mode coincide with those in the latter mode in the liquid-crystal display device 1. This makes it possible to switch between the right-aligned display mode and the full display mode 3 in the field period to provide a special representation in the right-aligned/full composite display mode.

Figure 13D:
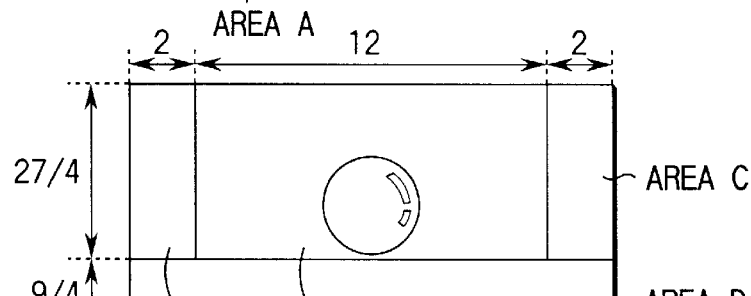

Furthermore, in the centering/full composite display mode shown in FIG. 13D, the representations on area A, area B, and area C are controlled with the drive timing of the centering display mode on the basis of the control signal CONT from the controller section 411. Because of restrictions on the drive timing of the centering display mode, area D is controlled with the drive timing of the full display mode 1.

Specifically, since the centering display mode and full display mode 1 have the same polarity inverting signal POL, vertical start signal VST, and vertical clock signal VCK, the horizontal select period and the polarity inverting timing of the video signal Video and counter electrode voltage Vcom in the former mode coincide with those in the latter mode in the liquid-crystal display device 1. This makes it possible to switch between the centering display mode and the full display mode 1 in the field period to provide a special representation in the centering/full composite display mode.

Figure 13E:
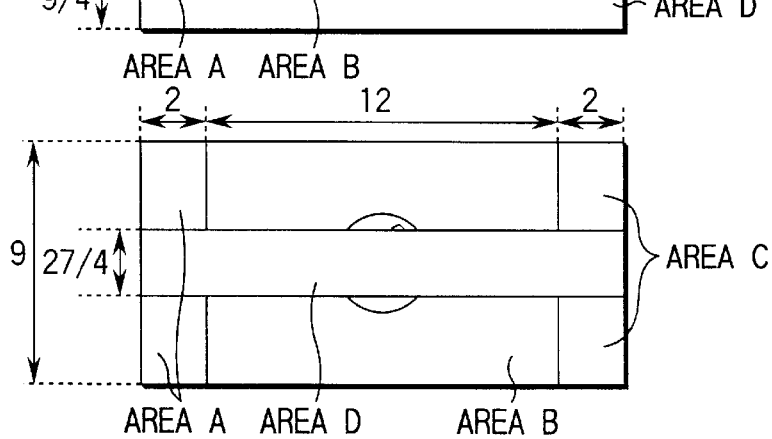

Additionally, the centering/full irregular composite mode of FIG. 13E is coped with by suitably controlling the timing of the switching between the centering display mode and full display mode 1 in the vertical scanning period.

Similarly, the left-aligned/full irregular composite mode and right-aligned/full irregular composite mode are coped with by suitably controlling the timing of the switching between the left-aligned display mode and full display mode 2 or the timing of the switching between the right-aligned display mode and full display mode 3 in the vertical scanning period.

While in the above embodiment, the explanation has been given taking the video signal Video in the NTSC system as example, other types of signals may be displayed.

Furthermore, the number of display modes may be increased by suitably combining the above-described modes with a zoom display mode in which the video signal Video 1 in part of the effective video period is selectively sampled and displayed.

While in the liquid-crystal display device of the embodiment, the active matrix display device where a TFT is electrically connected to each pixel has been explained, MIM (Metal Insulator Metal) elements may be used as switching elements.

Industrial Applicability

With the image displaying method and device of the present invention, various display modes, especially composite display modes or irregular composite display modes, can be realized without complex circuit configurations.

What is claimed is:

1. An image displaying method for displaying an image on a display panel which is composed of signal lines and scanning lines crossing at right angles, pixel electrodes arrayed via switching elements near the intersections of said signal lines and scanning lines, a counter electrode facing said pixel electrodes, and an optical modulation layer arranged between said pixel electrodes and said counter electrode, comprising the steps of:

outputting sequentially a scanning pulse the scanning lines to conduct between said signal lines and said pixel electrodes during a horizontal select period;

sampling sequentially a video signal including more than one horizontal scanning period in a vertical scanning period for each a specific period of said horizontal select period; and outputting the resulting pixel signal voltages to said signal lines while outputting a counter electrode voltage to said counter electrode;

said image displaying method further comprises the step of:

in a case where the vertical scanning period includes a first vertical scanning period for displaying of said pixel signal voltages sequentially sampled over a first period shorter than said horizontal scanning period of said video signal, and a second vertical scanning period for displaying of said pixel signal voltages sequentially sampled over a second period substantially equal to said horizontal scanning period, causing said horizontal select period to be synchronized with said second period of said second vertical scanning period.

2. The image displaying method according to claim 1, wherein said video signal and counter electrode voltage are inverted in polarity with respect to a reference voltage in synchronization with said horizontal select period.

3. The image displaying method according to claim 1, wherein said video signal includes a first effective video period corresponding to said horizontal scanning period and a first blanking period between said first effective video periods in said first vertical scanning period.

4. The image displaying method according to claim 3, wherein said video signal is formed by combining a second video signal including a second effective video period corresponding to said horizontal scanning period and a second blanking period between said second effective video periods and a third video signal including a third effective video period corresponding to said second blanking period in said second vertical scanning period.

5. The image displaying method according to claim 4, wherein said first period corresponds to said first effective video period and said second period corresponds to said second effective video period and said third effective video period.

6. The image displaying method according to claim 5, wherein the sampling speed in said second effective video period of said second period is lower than the sampling speed in said third effective video period.

7. An image displaying device comprising:

a display panel which is composed of signal lines and scanning lines crossing at right angles, pixel electrodes arrayed via switching elements near the intersections of said signal lines and scanning lines, a counter electrode facing said pixel electrodes, and an optical modulation layer arranged between said pixel electrodes and said counter electrode;

a scanning line driving circuit for sequentially outputting a scanning pulse to the scanning lines to conduct between said signal lines and said pixel electrodes during a horizontal select period;

a signal line driving circuit for sequentially sampling a video signal including more than one horizontal scanning period in a vertical scanning period for each a specific period of said horizontal select period and outputting the resulting pixel signal voltages to said signal lines;

a counter electrode driving circuit for outputting a counter electrode voltage to said counter electrode; and a control circuit section for determining the timing of said horizontal select period on the basis of an externally inputted display mode select signal;

wherein in a case where a display mode is selected which allows the vertical scanning period to include a first vertical scanning period for displaying of said pixel signal voltages sequentially sampled over a first period shorter than said horizontal scanning period of said video signal, and a second vertical scanning period for displaying of said pixel signal voltages sequentially sampled over a second period substantially equal to said horizontal scanning period, said control circuit section is arranged such that said horizontal select period is synchronized with said second period of said second vertical scanning period.

8. The image displaying device according to claim 7, further comprising a polarity inverting circuit for inverting said video signal and counter electrode voltage in polarity with respect to a reference voltage in synchronization with said horizontal select period.

9. The image displaying device according to claim 7, further comprising a video signal processing circuit for outputting a video signal including a first video signal including a first effective video period corresponding to said horizontal scanning period and a first blanking period between said first effective video periods in said first vertical scanning period and further outputting a video signal formed by combining a second video signal including a second effective video period corresponding to said horizontal scanning period and a second blanking period between said second effective video periods and a third video signal including a third effective video period corresponding to said second blanking period in said second vertical scanning period.

10. The image displaying device according to claim 9, wherein said first period corresponds to said first effective video period and said second period corresponds to said second effective video period and said third effective video period.

11. The image displaying device according to claim 10, further comprises a clock generator circuit which generates a sampling clock for said sampling and which sets the frequency of the sampling clock in said second effective video period of said second period lower than that of said third effective video period.

12. An image displaying device comprising:

a display panel having a display area which is composed of horizontal scanning lines including display pixels connected to signal lines;

a signal line driving circuit section for sampling a video signal including more than one effective video period and a blanking period between said effective video periods in a vertical scanning period to produce pixel signal voltages and supplying the voltages to said signal lines for each of said horizontal scanning lines;

a drive timing select circuit section for selecting one of a first timing and a second timing different from the first timing in said blanking period of said video signal; and a polarity inverting circuit section for inverting said video signal in polarity with respect to a reference voltage on the basis of one of said first and second timing selected by said drive timing select circuit section;

wherein said drive timing select circuit section is arranged such that each of said first timing and said second timing is selectable when a pixel signal voltage corresponding to said first video signal is obtained from said video signal including a first video signal in said effective video period and outputted to said signal lines for each of said horizontal scanning lines.

13. The image displaying device according to claim 12, wherein said first timing is basically in synchronization with said effective video period and said second timing is basically in synchronization with said blanking period.

14. The image displaying device according to claim 13, further comprising an video signal processing circuit section for allocating said first video signal to any of said effective video periods in said vertical scanning period and a second video signal to said blanking period.

15. The image displaying device according to claim 14, wherein said drive timing select circuit section selects said first timing, when said vertical scanning period includes a first period in which a pixel signal voltage based on said first video signal is outputted to said signal liens corresponding to said horizontal scanning lines and a second period in which a pixel signal voltage based on said first video signal and said second video signal adjacent to and later than said first video signal is outputted to said signal lines corresponding to said horizontal scanning lines.

16. The image displaying device according to claim 14, wherein said drive timing select circuit section selects said second timing, when said vertical scanning period includes a first period in which a pixel signal voltage based on said first video signal is outputted to said signal liens corresponding to said horizontal scanning lines and a second period in which a pixel signal voltage based on said second video signal and said first video signal adjacent to and later than said second video signal is outputted to said signal lines corresponding to said horizontal scanning lines.

17. The image displaying device according to claim 12, wherein said drive timing select circuit section is set so as to be able to select any one of said first timing to said third timing, when a pixel signal voltage corresponding to said first video signal is obtained from said video signal including a third timing different from said first timing and said second timing in said blanking period of said video signal and a first video signal in said effective video period and is outputted to said signal lines for each of said horizontal scanning lines.

18. The image displaying device according to claim 17, wherein said first timing is substantially synchronized with said effective video period and said second timing is substantially synchronized with said blanking period, and said third timing is set almost in the center of said blanking period.

19. The image displaying device according to claim 18, further comprising an video signal processing circuit section for allocating said first video signal to any of said effective video periods in said vertical scanning period and a second and a third video signal to said blanking period.

20. The image displaying device according to claim 19, wherein said drive timing select circuit section selects said third timing, when said vertical scanning period includes a first period in which a pixel signal voltage based on said first video signal is outputted to said signal liens corresponding to said horizontal scanning lines and a second period in which a pixel signal voltage based on said second video signal, said first video signal adjacent and later than said second video signal, and said third video signal adjacent to and later than said first video signal is outputted to said signal lines corresponding to said horizontal scanning lines.

21. The image displaying device according to claim 12, wherein said display pixels include pixel electrodes connected to said signal lines, a counter electrode facing said pixel electrodes, and an optical modulation layer placed between said pixel electrodes and said counter electrode, said counter electrode being connected to a counter electrode driving circuit section for supplying a counter electrode voltage.

22. The image displaying device according to claim 21, wherein said counter electrode driving circuit section outputs said counter electrode voltage inverted in polarity with respect to a reference voltage on the basis of said first or second timing at said drive timing select circuit section.

23. The image displaying device according to claim 12, wherein said display pixels include scanning lines provided for said horizontal scanning lines in a one-to-one ratio, said pixel electrodes are electrically connected via switching elements to said signal lines and said scanning lines, and there is provided a scanning line driving circuit section for outputting sequentially a scanning pulse for conducting between said signal lines of said switching elements and said pixel electrodes.

24. The image displaying device according to claim 23, wherein said scanning line driving circuit determines the timing of said select period on the basis of said first or second timing at said drive timing select circuit section.

25. An image displaying device comprising:
a display panel having a display area which is composed of pixel electrodes connected to signal lines, a counter electrode facing the pixel electrodes, and horizontal scanning lines including display pixels made up of an optical modulation layer arranged between said pixel electrodes and said counter electrode;
a signal line driving circuit section for sampling, with specific timing, a video signal including more than one effective video period and a blanking period between said effective video periods in a vertical scanning period to produce pixel signal voltages and supplying the voltages to said signal lines for each of said horizontal scanning lines;
a drive timing select circuit section for selecting one of a first timing and a second timing different from the first timing in said blanking period of said video signal; and
a counter electrode driving circuit section for supplying a counter electrode voltage inverted in polarity with respect to a reference voltage to said counter electrode on the basis of one of said first and second timing selected by said drive timing select circuit section;
wherein said drive timing select circuit section is arranged such that each of said first timing and said second timing is selectable when a pixel signal voltage corresponding to said first video signal is obtained from said video signal including a first video signal in said effective video period and outputted to said signal lines for each of said horizontal scanning lines.

* * * * *